United States Patent [19]

Littmann

[11] Patent Number: 4,532,045
[45] Date of Patent: Jul. 30, 1985

[54] BLEED-OFF ELIMINATION SYSTEM AND METHOD

[75] Inventor: Robert J. Littmann, Westfield, N.J.

[73] Assignee: Waterscience, Inc., Somerville, N.J.

[21] Appl. No.: 396,042

[22] Filed: Jul. 7, 1982

[51] Int. Cl.³ .............................................. B01D 15/04
[52] U.S. Cl. .................................... 210/668; 210/676; 210/685; 210/167; 210/266; 210/269; 210/295
[58] Field of Search ................ 422/7, 16, 19; 261/3, 261/DIG. 46; 210/167, 180, 181, 182, 188, 253, 266, 269, 295, 663, 664, 668, 673, 676, 681, 683, 685, 687

[56] References Cited

U.S. PATENT DOCUMENTS

| | | | |
|---|---|---|---|
| 1,915,484 | 6/1933 | Bridge | 210/136 |
| 1,927,228 | 9/1933 | Compton | 210/175 |
| 1,965,339 | 7/1934 | Hall | 210/665 |
| 2,101,197 | 12/1937 | Rice | 210/662 |
| 2,330,865 | 10/1943 | Butzler | 423/158 |
| 2,433,167 | 12/1947 | Smith | 210/677 |
| 2,780,357 | 2/1957 | Robinson | 210/101 |
| 2,807,582 | 9/1957 | Applebaum | 210/664 |
| 2,861,689 | 11/1958 | Lyall | 210/175 |
| 3,094,133 | 6/1963 | Treanor | 137/101.11 |
| 3,168,138 | 2/1965 | Stoker et al. | 165/119 |
| 3,196,892 | 7/1965 | Savage et al. | 137/114 |
| 3,282,277 | 11/1966 | Hayman | 137/3 |
| 3,332,871 | 7/1967 | Robinson | 210/697 |
| 3,400,022 | 9/1968 | Asai | 148/6.14 R |
| 3,405,060 | 10/1968 | Carter et al. | 210/698 |
| 3,450,265 | 6/1969 | Kreusch et al. | 210/140 |
| 3,462,365 | 8/1969 | Vogelsang | 210/699 |
| 3,492,240 | 1/1970 | Hettinger | 210/701 X |
| 3,507,795 | 4/1970 | Gardner | 252/87 |
| 3,627,032 | 12/1971 | Glad et al. | 165/32 |
| 3,628,663 | 12/1971 | Derham et al. | 210/141 |
| 3,754,741 | 8/1973 | Whitehurst | 261/151 |
| 3,776,530 | 12/1973 | Griffith et al. | 261/4 |
| 3,805,880 | 4/1974 | Lawler | 165/1 |
| 3,879,288 | 4/1975 | Siegele | 429/111 |
| 3,989,624 | 11/1976 | Wachsmuth | 210/684 X |
| 4,055,048 | 10/1977 | Reed | 60/646 |
| 4,145,281 | 3/1979 | Weishaar et al. | 210/688 X |
| 4,247,371 | 1/1981 | Roller | 203/7 |
| 4,296,177 | 10/1981 | Freundlinger et al. | 428/408 |
| 4,305,826 | 12/1981 | Moses | 210/687 |

OTHER PUBLICATIONS

Betz Laboratories Inc., "Betz Handbook of Industrial Water Conditioning", 7th Edition, 1976, pp. 194–195.
*Idea±Exchange*, Dow Chemical Company, vol. 2-No. 3, 1979.
"Trent Cooling Tower Blowdown", *Power*, Boies et al., Aug. 1974.
Sidestream Softening to Achieve Zero Blowdown from Evaporation Cooling System", Presented 1/31/77 at the Cooling Tower Institute.

Primary Examiner—Richard V. Fisher
Assistant Examiner—W. Gary Jones
Attorney, Agent, or Firm—Lerner, David, Littenberg, Krumholz & Mentlik

[57] ABSTRACT

A heat exchange system and process for reducing bleed-off are disclosed employing a weak acid cation exchange resin for treating the aqueous liquid coolant. In one such system and process, the aqueous coolant is treated with a weak acid ion exchange resin to remove alkaline salts therefrom without removing salts of strong acids; suspended solids are removed from the circulating aqueous coolant; and an effective amount of additive selected from the group consisting of scale inhibitors, corrosion inhibitors, microbiocides, and mixtures thereof is introduced into the circulating aqueous coolant so that bleed-off from said system is substantially reduced.

33 Claims, 2 Drawing Figures

BLEED-OFF ELIMINATION SYSTEM AND METHOD

BACKGROUND OF THE INVENTION

The present invention relates to heat exchange systems employing an aqueous coolant. More specifically, the present invention relates to a system and method for reducing the amount of bleed-off required in such heat exchange systems.

In many heat exchange systems and processes, evaporation of aqueous coolant can cause concentration of dissolved salts, precipitation of salts, and concentration of suspended solids. This material concentration in the aqueous, coolant can cause various problems as further discussed below.

Cooling towers are frequently used as cooling devices in heat exchange systems. In such systems the heat transferred to the aqueous coolant causes the water to vaporize and thus increases the concentration of the ions and solids in the aqueous coolant. Also, there is loss of water and dissolved and suspended solids due to windage.

The concentration of dissolved ions, if left uncontrolled, quickly exceeds the solubility of the certain ions and therefore salts precipitate, e.g., $CaCO_3$. Such salt deposition causes various problems in boiler and cooling tower systems, i.e., it increases corrosion and scale buildup. The salt deposition also increases maintenance costs, reduces equipment life and substantially increases energy costs due to the insulating properties of the deposits which impede efficient heat transfer.

Even with dissolved ions of high solubility, such as sodium or potassium, corrosion of metals in the boiler or circulating cooling systems is increased because of the increased corrosivity due to increased electrolyte causing increased electron flow, thus accelerating the electrochemical action of metals and corrosive agents in the water. Thus, heat exchangers, boilers, distribution pipes, and pumps are commonly corroded by the concentration of such metallic elements in the system. Corrosion of these components and subsequent deposition of the corrosion by-products also leads to unscheduled down time, increases maintenance costs, reduces equipment life and substantially increases energy costs.

Furthermore, in addition to deposit formation and corrosion, high concentrations of dissolved ions reduce the surface tension of water, causing foam within the system. Such foam formation interfers with the heat transfer process.

Suspended solids can directly deposit onto the heat transfer surfaces and thus cause the same problems as with salt deposits. Suspended solids also increase corrosion by promoting concentration of corrosive ions beneath the deposits of such suspended solids.

Various techniques have been employed to control suspended solids and dissolved ions in heat transfer systems. Traditionally, such control has been achieved by removing some of the concentrated aqueous coolant and diluting it with make-up water of a lower dissolved ion and suspended solids concentration. This process is called bleed-off. Since the aqueous coolant normally contains various inhibitors for scale buildup, corrosion, and microbiological growth, these materials are removed during bleed-off. Therefore, new inhibitors must be added in the make-up water to insure that they are maintained at proper levels and therefore this bleed-off method substantially increases chemical usage. In addition, the bleed-off process results in substantial water usage. Furthermore, because the bleed-off water contains not only the inhibitors, but also the highly concentrated ions and suspended solids, the bleed-off water poses potential problems in terms of both water pollution and solid waste control.

Other techniques more complex and more costly than simple bleed-off have also been tried. For example, softening of the aqueous coolant by employing a sidestream aqueous water softener has been employed in an attempt to reduce the amount of bleed-off necessary in a circulating heat exchange system. For example, one such technique employs a sidestream softener and filter in order to remove suspended solids and certain ions which form solids from the water coolant circulating in the system. This system employs a by-pass lime softening step to accomplish such objective. Thus, in the process, only the recirculating cooling water is treated, and some ions are removed by precipitation while other ions are replaced by different ions (for example, calcium is replaced by sodium). This system removes chemicals from the system including some inhibitors, which may be included in the circulating water. Moreover, the system generates relatively large amounts of solid waste which must be disposed. Furthermore, the lime softening increases the alkalinity of the circulating cooling water, requiring the addition of relatively large amounts of acid, such as sulfuric acid, to the circulating cooling water to maintain the proper pH of the coolant. This acid addition, in itself, results in additional ions in the system along with the problems associated therewith. All of the above contribute to the capital and operational costs of such a system.

A similar technique is described in Lawlar U.S. Pat. No. 3,805,880. However, the Lawlar system includes a water softening treatment of the make-up water, employing, for example, a sodium zeolite water softener. Thus, the Lawlar system does not reduce the total number of ions in the circulating aqueous coolant system; but rather, it replaces certain low solubility cations such as calcium with higher solubility cations such as sodium. The Lawlar system thus will not avoid the problems resulting from high sodium and potassium contents, i.e., high alkalinity, the associated corrosive character thereof, the need to add acid to reduce such alkalinity and the associated ion build-up caused by acid addition. Moreover, while the Lawlar system does reduce bleed-off, it gives no regard to reducing or treating silica, which by itself will limit the cycles of concentration with the Lawlar system even with make-up water with moderate silica levels. Furthermore, in the only example in the Lawlar patent, only about 10 cycles of concentration were obtained.

Applebaum in U.S. Pat. No. 2,807,582 discloses a system for treating boiler feed water for high pressure boilers in which the feed water is first passed through a cold split stream hydrogen-sodium zeolite plant which reduces hardness to practically zero and reduces alkalinity to about 15 ppm, converting the alkalinity to free $CO_2$. The water is then degassified and pumped through anion exchange units, which are of the strongly basic type, thus greatly increasing the alkalinity of the cooling water. The patent even notes that the anion exchange effluent is too high in sodium hydroxide content to be used for boiler feed purposes. Therefore, sulfuric acid is added to neutralize the excess base. Thus, the Applebaum system requires a high capital cost for the various ion exchange treatment steps and is relatively complex in nature. Moreover, although the Applebaum system does remove some ions from the system by the split stream hydrogen zeolite portion of the first step, the Applebaum system still substitutes some $Na^+$ for hardness values in the water. Furthermore, the strong zeolite materials employed by Applebaum require about 6 times the amount of regenerant (e.g., acid for the acid zeolite) to regenerate the active forms.

SUMMARY OF THE INVENTION

It has now been discovered that a very economical and ecologically advantageous process and heat exchange system can be used to avoid many of the disadvantages of the above discussed processes and systems. The new process and system reduces bleed-off in open circulating heat exchange systems having circulating aqueous coolant by (1) treating the aqueous coolant with a weak acid cation exchange resin to remove alkaline salts therefrom without removing salts of strong acids; (2) removing suspended solids from the circulating aqueous coolant; and (3) introducing an effective amount of additive selected from the group consisting of scale inhibitors, corrosion inhibitors, microbiocides, and mixtures thereof into the circulating aqueous coolant so that, by the combination of steps (1), (2) and (3), the amount of bleed-off from said system is at most 66% of the bleed-off necessary in the same system without such combination of steps. Preferably, the scale inhibitors, corrosion inhibitors, and microbiocides are introduced in amounts effective so as to maintain a concentration of from about 2 to about 1000 ppm. of scale inhibitors, of from about 2 to about 1000 ppm. of corrosion inhibitors, and of from about 2 to about 1000 ppm. of microbiocides.

In another embodiment, an effective amount of additive selected from the group consisting of scale inhibitors, corrosion inhibitors, microbiocides and mixtures thereof is introduced into the circulating aqueous coolant so that, by combination of steps (1), (2) and (3), bleed-off from said system is reduced to substantially zero.

The invention also contemplates a process and system for reducing bleed-off from a boiler by treating water with a weak acid cation exchange resin to remove alkaline salts therefrom without removing salts of strong acids to provide treated water; and contacting the treated water in heat exchange relationship to a boiler to absorb heat therefrom and provide heated boiler water.

The system and process of the present invention have a number of significant advantages over the prior art systems and processes discussed above. Specifically, the system and process of the present invention is relatively simple in design and construction, while it reduces significantly the amount of water usage in circulating cooling systems such as systems employing cooling towers, i.e., the invention increases cycles of concentration. Also, by reducing the total number of ions in the aqueous coolant system, there are fewer ions available to deposit as salt or to increase the alkaline nature of the aqueous coolant. Thus, there is less salt deposition and less corrosion of the heat exchange system with a consequent reduction or elimination of the bleed-off normally necessary to remove deposits and other contaminants from the aqueous coolant system. Because there is reduced bleed-off, less scale inhibitors, corrosion inhibitors, microbiocides, etc. need to be added to the system for replacement purposes. Moreover, because there is reduced bleed-off, there is less need to handle inhibitors in the bleed-offs which can have adverse pollution effects, such as chromate ions, if used, which are very toxic. In summary, the present invention provides significantly reduced water usage, reduced scale inhibitor, corrosion inhibitor and microbiocide usage, and reduced solid wastes and pollution control problems, all of which make the system of the present invention economically competitive and ecologically more attractive than the prior art systems described above.

The weak acid cation exchange resin employed in the system and process of the present invention can be any such resin effective for the removal of alkaline salts, e.g., bicarbonate salts, from the aqueous coolant without removing salts of strong acids such as NaCl. Suitable weak acid cations exchange resins are of the carboxylic acid type cation exchangers. Examples of such carboxylic acid type cation exchangers include carboxylic divinyl benzene copolymers, copolymers of maleic anhydride with stryrene and divinyl benzene. Suitable weak acid cation exchange resins include CCR-2 available from Dow Chemical Company, IR 84 available from Rohm & Haas, and CC and CNN available from IONAC. Since such weak acid cation exchange resins exhibit a higher affinity for hydrogen ions than strong acid cation exchange resins, weak acid cation exchange resins are easily regenerated, with even dilute acid solutions, and do not require large excesses of acid.

Because of their very nature, the weak acid cation exchange resins employed in the present invention remove bicarbonate hardness from the aqueous cooling water, since bicarbonate is usually the predominate alkaline salt in make-up water. In the splitting reaction employing the weak acid cation exchange resin, high valence cations such as $Ca^{+2}$ and $Mg^{+2}$ are removed in strong preference to single valence cations such as $Na^+$ or $K^+$. Thus, the weak acid cation exchange resins used in accordance with the present invention remove both hardness values and bicarbonate from the make-up cooling water, e.g.:

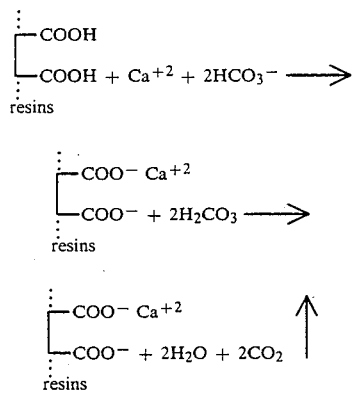

Because bicarbonate is removed from the make-up cooling water, there is not need to add acid to neutralize the bicarbonate. In addition, calcium and magnesium cations which would form precipitates with carbonates and hydroxides in the cooling water are also removed. Thus, with the present invention, the problems due to hardness and carbonates are efficiently alleviated in one step, without the need for adding further ions to the system.

The process and systems of the present invention are preferably employed in boiler cooling systems and open recirculating cooling systems, e.g., systems employing cooling towers as a cooling means. Typically, in a boiler system the aqueous coolant is provided to the boiler and vaporized in the boiler, and the steam produced can be used for various purposes, e.g., to drive a turbine, to provide heat at a remote site, etc. In an open circulating cooling system, the aqueous coolant typically come into exchange contact with a hot body, such as a condenser, the heated aqueous coolant is then passed to a cooling tower where heat is removed by partial evaporation, and the cooled aqueous coolant is returned to the hot body for further absorption of heat.

In a preferred embodiment of the present invention, the weak acid cation exchange resin is arranged for treating make-up aqueous coolant to be introduced into the system and process. Thus, the aqueous coolant entering the open circulating system or the boiler has alkaline salts (including bicarbonate hardness) removed therefrom as described above. However, the weak acid cations exchange resin can alternatively be used to treat the aqueous coolant circulating within the system, e.g., a sidestream of the circulating coolant.

The weak acid cation exchange resin can thus be contained, for example, in tanks installed on the make-up water line or on a sidestream line of the circulating aqueous coolant. All that is necessary is that the make-up or circulating cooling water contact the weak acid cation exchange resin in a manner so that the desired exchange occurs. Usually, this is accomplished by merely passing the cooling water through the tank containing the appropriate resin or resins.

The amount of weak acid cation exchange resin necessary to provide the desired ion removal varies depending upon the flow rate of the cooling water through the resin. An effective amount of the weak acid cation exchange resin is employed to provide the bicarbonate water hardness removal desired. Obviously, make-up water with a higher ion concentration will require more frequent regeneration of the resin than with make-up water having lower concentrations of ions. Typically, two or more tanks containing from about 10 to about 100 cubic feet of the weak acid cation exchange resin are employed with the present invention.

The cation exchange resins employed in the present invention can be regenerated by conventional means well known in the art. For example, the weak acid cation exchange resins can be regenerated merely by passing acid solution (even dilute acid) through the resin. Because of the very nature of the weak acid cation exchange resins, they require less acid for regeneration than strong acid ion exchange resins (e.g., sulfonate resins). For example, a weak acid cation exchange resin normally will require slightly more than 1 to 1 relationship between the depleted resin and the acid used for regeneration, while strong acid cation exchange resins require usually about 6 times the amount of acid to regenerate the resin to its acid form. Thus, the use of weak acid cation exchange resin is highly advantageous in that it reduces the amount of acid needed for regeneration and alleviates the pollution considerations involved with the higher acid usage with strong acid cation exchange resins.

Many times, especially with a boiler system, it is desirable to degassify or decarbonate the aqueous cooling liquid prior to contact with the hot body or other parts of the cooling water circulating system. This degassification step removes $CO_2$, for example, generated by the treatment of the aqueous coolant by the weak acid ion exchange resin.

In another embodiment, aqueous coolant can also be treated with a sodium or hydrogen strong acid cation exchange material to remove additional hardness values and/or an anion exchange material to remove additional anions. Whether such additional treatment is employed depends on the chemical composition of the make-up water and the purity desired and necessary for the circulating cooling water. When employed, the weak acid cation exchange resin and the strong acid cation exchange material can be connected in parallel by a split-stream of said water which is recombined after treatment. Alternatively, the weak acid cation exchange resin and the strong cation exchange material can be connected in series, or if desired in mixture. When the strong acid cation exchange material is employed, the treated water can also be treated with a hydroxide or chloride anion exchange resin to remove anions therefrom. The anion exchange resin can be employed in series, in parallel or in mixture with the strong acid cation exchange material.

For example, make-up water can be treated by weak acid cation exchange resins and strong acid cation exchange materials (e.g., sulfonate resins) connected in series with each other or in parallel (i.e., a split make-up stream) to remove bicarbonate and non-bicarbonate associated cations from make-up water. Likewise, weak acid cation exchange resin and strong base anion exchange resin (e.g. anion exchange resin) can be employed to remove bicarbonate associated cations and various anions from the make-up cooling water. The same treatments can be provided by side-stream treatment of circulating aqueous coolant.

Suitable strong acid cation exchange material for use in the above-described embodiment includes hydrogen and sodium zeolites and hydrogen and sodium sulfonate resins. Examples of such strong acid cation exchange materials include HCR-S or HGR-W available from Dow Chemical Company, IK 120+ available from Rohm & Haas Chemical Company, and C 249 available from IONAC. Suitable anion exchange materials include those which exchange hydroxide or chloride anions for other anions in the aqueous coolant. Examples of such anion exchange materials are SBR and SAR available from Dow Chemical Company and IKA 400 available from Rohm & Haas Chemical Company.

As with the weak acid cation ion exchange resin discussed above, an effective amount of the strong acid cation exchange material and/or anion exchange material is employed to achieve the ion removal desired. Again, all that is necessary is that the aqueous coolant contact the ion exchange material for a sufficient time to achieve the desired ion removal.

When anion exchange resin is employed in the system or process of the present invention, an acid is preferably added to the treated water to neutralize alkalinity therein. Preferably, sulfuric acid is employed in such a neutralization procedure.

In a preferred embodiment of the present invention, the heat exchange system is a circulating heat exchange system including a body from which heat is to be removed by the circulating aqueous coolant, means for cooling the circulating aqueous coolant and means for circulating the aqueous coolant between the body and the means for cooling. Such a system preferably is an open recirculating system employing at least one cooling tower as the means for cooling. The circulating heat exchange system preferably has the weak acid cation exchange resin arranged for treating make-up aqueous coolant to be introduced into the system. However, the weak acid cation exchange resin could be used to treat solely the circulating aqueous coolant and/or both the circulating aqueous coolant and make-up aqueous coolant.

In another preferred embodiment of the present invention, in addition to treatment of the make-up water with a weak acid ion exchange resin, a sidestream of the circulating aqueous coolant is treated with a purifying means, e.g., any conventional means to remove suspended solids such as a filter, cation or anion exchange material as described above, and/or weak acid cation exchange resin. In one such a system or process, a portion of the circulating aqueous coolant from a boiler or from the circulation between the hot body and the cooling means of a circulating heat exchange system is withdrawn. The withdrawn portion is treated by the purifying means in the sidestream above and then is returned to the normal circulation. Preferably, this is performed continuously by providing a closed loop sidestream line or pipe in the circulating system having the appropriate treatment apparatus in the line. With a boiler system, the condensate from the boiler can also be treated in a like manner and recycled to the boiler.

The above-described suspended solids removal can be employed to remove various sizes of suspended solids from the aqueous coolant, while an ion exchange step will further remove ions from the aqueous coolant. The equipment for removing dissolved solids is conventional in the art and thus need not be described further here. For example, filtration, sedimentation, or centrifugal separation can be employed. Filtration is preferred with sand filters being particularly suitable. The ion exchange equipment and compositions can be the same as those described above, including strong and/or weak acid cation exchange resins, anionic exchange resins and water softening materials, such as sodium zeolite. In one such embodiment, a weak acid cation exchange resin is included in the sidestream either in series with or parallel with a filter.

The heating means or hot body can be any conventional apparatus, e.g., process equipment, from which it is desired to remove heat. Examples of such apparatus include a boiler, condensers, water/water heat exchangers, etc.

The cooling towers, the means for heating the aqueous coolant, and the pumps, pipes, valves, etc., in the system and process of the invention are also conventional in the art. For example, any conventional cooling tower can be employed in the present invention. Typically, the heated aqueous coolant is permitted to flow over a large surface area while being subjected to a forced draft of air to bring about evaporation of a portion of the aqueous coolant, with the remaining cooled portion of the aqueous coolant being pumped back into the system.

The aqueous coolant employed in the present invention can also include conventional scale inhibitors, corrosion inhibitors, microbiocides, anti-foaming agents, and/or iron dispersants or mixtures thereof. Almost every system will include scale inhibitors and microbiocides, but corrosion inhibitors may not be necessary in system employing non-corroding elements, for example, ceramic cooling towers, etc. Preferably, the amounts of scale inhibitors, corrosion inhibitors and/or microbiocides are introduced into the circulating aqueous coolant so that, by combination of treatment with the weak cation exchange resin, removal of dissolved solids and such inhibitors, the amount of bleed-off from the system is at most 66%, preferably 33%, of the bleed-off necessary in the same system without such combination of steps. Typically, the scale inhibitors, corrosion inhibitors, and microbiocides are maintained in the circulating aqueous coolant each at a concentration of from about 2 to about 1000 ppm., preferably from about 75 to 200 ppm. It should be pointed out, however, that the concentration of corrosion inhibitors, scale inhibitors, microbiocides, etc., vary depending upon a number of factors, including the ion content of the make-up water and the physical and chemical composition of the heat exchange system itself. With the process and system of the present invention, higher levels of these inhibitors and microbiocides are usually maintained, but this is not a concern since bleed-off is substantially reduced and therefore total usage of such materials is also reduced. Preferably, the amounts of scale inhibitor, corrosion inhibitor and/or microbiocide in the circulating aqueous coolant is such that bleed-off from the system is reduced to substantially zero.

Suitable scale inhibitors include phosphates such as tetrasodium pyrophosphate, phosphonates such as HEDP available from Monsanto or WS-58 available from Waterscience, Inc., and polyacrylates (such as polyacylic acid or acrylate/acrylamide copolymers) having a molecular weight of less than about 10,000 and preferably less than about 5,000 such as Goodrite available from Goodrich Chemical Company and K752, or WS-62 available from Waterscience, Inc. Preferred scale inhibitors are phosphates and the polyacrylates having molecular weights less than about 5000, e.g., WS-58 available from Waterscience, Inc. The scale inhibitors, especially the phosphonates and acyrlates, are believed to sequester the $Ca^{+2}$ and to maintain the silica in a colloidal state so as not to form scale within the system.

Suitable corrosion inhibitors for use in the present invention include film forming polar organic materials such as MBT (mercaptobenzothiazole), divalent cations such as $Zn^{+2}$, and doubly charged anions such as chromate, molybdate and phosphate. A preferred corrosion inhibitor is $ZnMoO_4$.

Suitable microbiocides include oxidizing and non-oxidizing microbiocides. Oxidizing microbiocides include halogens such as bromine, chlorine or hypochlorite. Suitable non-oxidizing microbiocides include quaternary amines such as WS-27 available from Waterscience, Inc., MBT (methylene bis thiocyanate), TBTO (tributyl tin oxide), thiazone, chlorophenol, and sulfones. Preferred microbiocides are WS-27 and bromine or chlorine.

While in theory water loss with the system and process of the present invention should not be necessary, some water loss is uncontrollable, for example, through windage losses in a cooling tower. Typically, about 0.01% to about 0.05% of the aqueous coolant is lost per day in a cooling tower system.

DETAILED DESCRIPTION OF THE INVENTION

Figure 1:
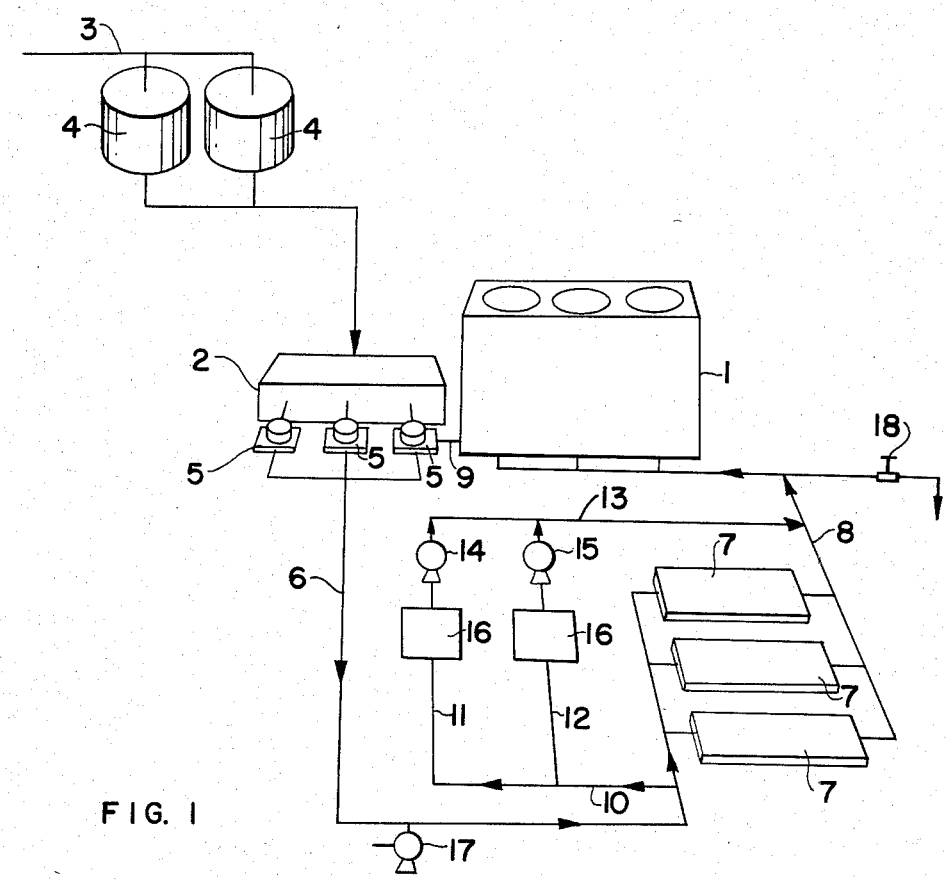
FIG. 1 is a pictorial representation of one embodiment of the present invention employing an open circulating cooling system.

In a preferred embodiment as shown in FIG. 1, the system of the present invention is a circulating cooling system including cooling towers 1 to cool the aqueous coolant. The cooling towers 1 employed in this system can be any of the conventional cooling towers used in the art with evaporating surfaces. The water level in the cooling tower can be maintainted through control of the level of the make-up water in reservoir 2. Make-up water to be purified is supplied through line 3 to the ion exchange system 4 which includes the desired weak acid cation exchange resin. The equipment for the ion exchange system 4 can consist of single or multiple tanks, for example, installed directly on the cooling tower make-up water line 3. The tanks 4 contain an effective amount of the weak acid cation exchange resin in order to provide the desired removal of alkaline salts, usually bicarbonate hardness, from the make-up water. The weak acid cation exchange media can be regenerated simply by passing acid solution through the depleted resin.

Circulating pumps 5 force the cooling water through the system via lines or pipes 6 to the hot equipment 7 to be cooled, which equipment can consist of, for example, a reactor, condenser, etc. The heated cooling water flows from the hot equipment 7 through lines or pipes 8 and over the evaporating surfaces of the cooling tower 1, thus presenting a large surface of the aqueous coolant to the air as the coolant is forced through the tower. The cooled water is then cycled back to the process equipment 7 via lines or pipes 6 and 9.

As shown in FIG. 1, a sidestream purification step can be provided through lines 10, 11, 12 and 13 and pumps 14 and 15. Thus, the purification equipment 16 can be, for example, conventional filtration equipment to remove suspended solids and/or ion exchange equipment and media as described above to soften or to remove additional ions from the circulating aqueous coolant. The purification equipment 16 can include a weak acid cation exchange resin, either alone or in combination with a filter, e.g., sand filters.

Additives can be added to the aqueous coolant at various points in the system and process. For example, additives such as scale inhibitors, corrosion inhibitors, or microbiocides can be added to the make-up water in the reservoir 2 or via pumps 17 at any other appropriate point in the system, for example, the pH, hardness, etc., can be monitored and an appropriate amount of the additive can be added as indicated by the monitoring.

While in theory little or no bleed-off is necessary with the present invention, a bleed-off valve 18 can be provided as a back-up for system failure, etc.

Figure 2:
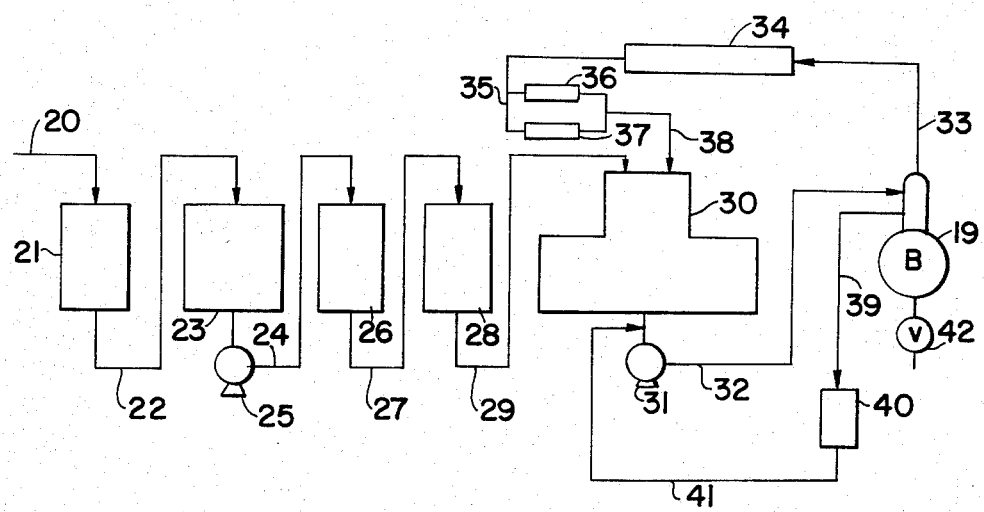
FIG. 2 is a block diagram of another embodiment of the present invention employing a closed circuit cooling system.

FIG. 2 illustrates a system and process in accordance with the invention employing a closed circuit cooling system, for example, with a boiler 19 as the hot body from which heat is to be removed. In such a system, cooling water enters through line 20 and passes through a vessel 21 containing the weak acid cation exchange resin. The treated cooling water can then pass through line 22 to a degassifier or decarbonator 23 where condensable gasses such as carbon dioxide are removed. The treated and degassified cooling water is then optionally passed via line 24 and, pump 25 to a vessel 26 containing a strong acid cation exchange material acting in the hydrogen or sodium cycle. This strong acid cation exchange material will remove further water hardness from the cooling water. The water treated with the strong acid cation exchange material can also optionally be passed via line 27 to a vessel 28 containing anion exchange material. The anion exchange material can, for example, replace other anions with hydroxide, and thus, in combination with the strong acid cation exchange material, can provide a more highly purified system when that is desired. The treated cooling water is then passed via line 29 to a deaerator 30 where noncondensable gasses (such as some oxygen) are removed. When the strong acid cation exchange and/or anion exchange are not necessary, the cooling water from the weak acid cation exchange step can be passed directly from line 24 to line 29 and/or to the deaerator 30. From the deaerator, the treated cooling water is passed via pump 31 and line 32 to the boiler 19. Steam from the boiler can pass via line 33 to any desired heat exchange system 34, e.g., a steam turbine, a conventional heat exchanger, etc. The condensate from the boiler can be collected via line 35 and optionally passed through one or more devices 36 and 37 to remove suspended solids, e.g., sand filters. The cooled and purified water can then be passed via line 38 to the deaerator 30. As another option, a portion of the boiler cooling liquid can be withdrawn via line 39 and passed through a device 40 to remove suspended solids, e.g., a sand filter, and via line 41, pump 31 and line 32 back to the boiler 19. While the system in accordance with the present invention as shown in FIG. 1 can substantially reduce the need for bleed off from the boiler, a valve 42 can be provided for bleeding off some cooling water from the boiler.

A system in accordance with the present invention as basically described in connection with FIG. 1 (but with only a sidestream filtration, e.g. no ion exchange in the sidestream) was applied to an industrial size cooling tower heat exchange system. The system was operated with a total water usage of 64,800 gallons/day at 100% load. The heat exchanges were steam condensers. The cooling water was circulating at the rate of about 5,000 gal/min. The sidestream constituted approximately 3% of the circulating system or about 100 gal/min. The sidestream filtering was performed using three 30 inch sand filters. Make-up cooling water was passed through 2 tanks containing CCR-2 weak acid cation exchange resin available from Dow Chemical Company, with each tank containing about 100 cubic feet of the resin. Tolytriazole, a chlorine source (Biox 100 available from Waterscience, Inc.), organic phosphate and polyacrylate (WS-58 commercially available from Waterscience, Inc.), and quaternary amine (WS-27 commercially available from Waterscience, Inc.) were added via pumps so that each of these materials was maintained at about 100 ppm. in the circulating cooling water. Also, the pH was maintained at about 8.

Table 1 illustrates the water usage before (i.e., without the weak acid cation exchange treatment, without the sidestream filtration treatment and without the above-described treatment) and after application of the system of the present invention as described above.

TABLE 1

|  | DAILY EVAPORATION | DAILY BLEED-OFF (AT 33%) | TOTAL DAILY WATER USAGE |
|---|---|---|---|
| WITHOUT SYSTEM OF INVENTION |  |  |  |
| At 50% Load | 21,600 gal. | 10,800 gal. | 32,400 |
| At 100% | 43,200 gal. | 21,600 gal. | 64,800 |
| WITH SYSTEM OF INVENTION |  |  |  |
| At 50% Load | 21,600 gal. | — | 21,600 |
| At 100% Load | 43,200 gal. | — | 43,200 |

Thus, it is readily apparent from Table 1 that the system in accordance with the present invention provides a significant savings in daily water usage.

The make-up water before any treatment with the system of the present invention was analyzed and found to have approximately the following composition expressed in micro mhos: hardness, 132; calcium, 94; alkalinity, 92; and total dissolved solids (TDS), 460. To provide a contrast, the same analysis was performed on the make-up water in the reservoir 2 at various times after application of the system of the invention. Thus, Table 2 lists the water usage and corresponding make-up water composition in the make-up water reservoir (i.e., after treatment with the weak acid cation exchange resin) on various days after application.

TABLE 2

MAKE-UP WATER CHEMISTRY WITH SYSTEM OF INVENTION

| DAY NO. | LEFT METER GALLONS | RIGHT METER GALLONS | HARDNESS | CALCIUM | ALK | TDS |
|---|---|---|---|---|---|---|
| 1 | 24,100 | 59,300 | 22 | 8 | 0 | 270 |
| 5 | 125,200 | 159,200 | 30 | 11 | 0 | 270 |
| 7 | 175,400 | 207,600 | 40 | 24 | 6 | 250 |
| 12 | 261,700 | 312,600 | 40 | 22 | 10 | 270 |
| 15 | 289,200 | 365,100 | 48 | 28 | 10 | 270 |
| 18 | 332,600 | 397,900 | 65 | 37 | 20 | 310 |
| 28 | 471,500 | 538,100 | 51 | 28 | 40 | 330 |
| 35 | 552,700 | 625,700 | 45 | 24 | 9 | 290 |
| 40 | 630,900 | 710,800 | 36 | 12 | 12 | 250 |

The composition of the condenser water circulating in the heat exchange system was likewise determined both before and on various days after the application of the system in accordance with the present invention. In addition, the cycles of concentration were determined based on untreated and treated make-up water quality. Cycles of concentration are a measure of the number of times make-up water is concentrated in the condenser water, e.g., through evaporation. In this case cycles of concentration were determined in terms of calcium concentrations, i.e., condenser water $Ca^{+2}$/make-up water $Ca^{+2}$. The results shown in Table 3 are the values before application of the system in accordance with the present invention, while Table 4 shows the results on various days after application of the system of the invention.

TABLE 3

CONDENSER WATER CHEMISTRY (WITHOUT SYSTEM OF INVENTION)

| HARDNESS | CALCIUM | ALKALINITY | TDS | CYCLES OF CONCENTRATION BASED ON UNTREATED MAKE-UP WATER QUALITY |
|---|---|---|---|---|
| 598 | 428 | 185 | 1700 | 4.6 |
| 616 | 616 | 182 | 1700 | 6.6 |

TABLE 4

CONDENSER WATER CHEMISTRY (WITH SYSTEM OF INVENTION)

| DAY NO. | HARDNESS | CALCIUM | ALKALINITY | TDS | CYCLES OF CONCENTRATION BASED ON TREATED MAKE-UP WATER QUALITY |
|---|---|---|---|---|---|
| 5 | 964 | 450 | 190 | 4000 | 40.9 |
| 12 | 1260 | 572 | 210 | 4500 | 26.0 |
| 18 | 1000 | 450 | 201 | 4200 | 12.2 |
| 22 | 932 | 568 | 195 | 4300 | —[1] |
| 28 | 1060 | 670 | —[1] | 4000 | 23.9 |
| 35 | 730 | 492 | 160 | 3500 | 20.5 |

[1] No measurement taken

It is readily apparent from Tables 3 and 4, and especially from the cycles of concentration, that the system in accordance with the present invention provides significant advantages over the simple bleed-off system by providing reduced chemical usage, elimination of pollutants in effluent, and reduced chemical usage overall.

It will be understood that the embodiments described above are merely exemplary and that persons skilled in the art may make many variations and modifications without departing from the spirit and scope of the invention. All such modifications and variations are intended to be included within the scope of the invention as defined by the appended claims.

What is claimed is:

1. A process for reducing bleed-off in an open circulating heat exchange system having circulating aqueous coolant, said process comprising the steps of (1) treating all or a selected portion of the aqueous coolant with a weak acid ion exchange resin to remove alkaline salts therefrom without removing salts of strong acids and to produce in situ carbonic acid from bicarbonate hardness in the aqueous coolant and thereby control the pH of the circulating aqueous coolant; (2) removing suspended solids from circulating aqueous coolant; (3) removing carbon dioxide from the carbonic acid produced in the treating step; and (4) introducing an effective amount of additional selected from the group consisting of scale inhibitors, corrosion inhibitors, microbiocides, and mixtures thereof into the circulating aqueous coolant so that, by the combination of steps (1), (2), (3) and (4), the amount of the bleed-off from said system is at most 66% of the bleed-off necessary in the same system without such combination of steps.

2. A process for reducing bleed-off in an open circulating heat exchange system having circulating aqueous coolant, said process comprising the steps of (1) treating all or a selected portion of the aqueous coolant with a weak acid ion exchange resin to remove alkaline salts therefrom without removing salts of strong acids and to produce in situ carbonic acid from bicarbonate hardness in the aqueous coolant and thereby control the pH of the circulating aqueous coolant; (2) removing suspended solids from the circulating aqueous coolant; (3) removing carbon dioxide from the carbonic acid produced in the treating step; and (4) introducing effective amounts of scale and corrosion inhibitors and microbiocides into the circulating aqueous coolant so as to maintain a concentration of from about 10 to about 1000 ppm. of scale inhibitors, of from about 10 to about 1000 ppm. of corrosion inhibitors, and of from about 10 to about 1000 ppm. of microbiocides.

3. A process for reducing bleed-off in an open circulating heat exchange system having circulating aqueous coolant, said process comprising the steps of (1) treating all or a selected portion of the aqueous coolant with a weak acid ion exchange resin to remove alkaline salts therefrom without removing salts of strong acids and to produce in situ carbonic acid from bicarbonate hardness in the aqueous coolant and thereby control the pH of the circulating aqueous coolant; (2) removing suspension solids from the circulating aqueous coolant; (3) removing carbon dioxide from the carbonic acid produced in the treating step; and (4) introducing an effective amount of additive selected from the group consisting of scale inhibitors, corrosion inhibitors, microbiocides and mixtures thereof into the circulating aqueous coolant so that, by combination of steps (1), (2), (3) and (4) bleed-off from said system is reached to substantially zero.

4. A process according to claim 1, 2 or 3, wherein said weak acid ion exchange resin is a carboxylic acid type cation exchange resin.

5. A process according to claim 1, 2 or 3, wherein the aqueous coolant is circulating between a body from which heat is to be removed and a cooling tower where cooling is performed by partial evaporation to provide cooled aqueous coolant.

6. A process according to claim 5, wherein said removing step is performed by filtering.

7. A process according to claim 5, further comprising introducing make-up aqueous liquid coolant to replace aqueous liquid coolant lost during said cooling step.

8. A process according to claim 7, wherein said step of treating aqueous liquid coolant is performed on said make-up aqueous coolant.

9. A process according to claim 7, wherein said step of treating said aqueous liquid coolant is performed on the aqueous liquid coolant circulating between said body and said cooling tower.

10. A process according to claim 9, wherein said step of treating said circulating aqueous liquid coolant with said weak acid ion exchange resin is performed in a sidestream of said circulating aqueous coolant.

11. A process according to claim 5, wherein said filtering step is performed by withdrawing a portion of said circulating aqueous coolant, by filtering said portion of said circulating aqueous coolant to provide a purified aqueous liquid coolant, and by returning said purified aqueous liquid coolant to said circulation.

12. A process according to claim 11, further comprises treating at least a portion of said withdrawn aqueous liquid coolant with a weak acid ion exchange resin capable of removing alkaline salts without removing salts of strong acids.

13. A process according to claim 5, wherein said scale inhibitors is selected from the group consisting of phosphonates, polyacrylate having molecular weights below about 10,000, and mixtures thereof.

14. A process according to claim 5, wherein said corrosion inhibitor is selected from the group consisting of filming-forming polar organic compounds, divalent anions, divalent cations, and mixtures thereof.

15. A process according to claim 5, wherein said microbiocide is selected from the group consisting of oxidizing microbiocides, non-oxidizing organic microbiocides, and mixtures thereof.

16. An open circulating heat exchange system comprising a body from which heat is to be removed by a circulating aqueous coolant; a cooling tower; means for circulating the aqueous coolant between said body and said cooling tower; a weak acid ion exchange resin arranged for passage of aqueous coolant therethrough, wherein said weak acid ion exchange resin is capable of treating all or a portion of the aqueous coolant to remove alkaline salts therefrom without removing salts of strong acids and to produce in situ carbonic acid from bicarbonate hardness in the aqueous coolant and thereby provide control of the pH of the circulating cooling water, wherein carbon dioxide from the carbonic acid produced in the treating step can be removed from the system in said cooling tower; means for removing suspended solids from at least a portion of said circulating aqueous coolant; and means for introducing additives selected from the group consisting of scale inhibitors, corrosion inhibitors, microbiocides and combinations thereof into the circulating aqueous coolant.

17. A system according to claim 16, wherein said weak acid ion exchange resin is a carboxylic acid type cation exchange resin.

18. A system according to claim 16 or 17, wherein said weak acid ion exchange resin is arranged for treating make-up aqueous coolant to be introduced into said system.

19. A system according to claim 16 or 17, further comprising a means for bleed-off a portion of the aqueous coolant from said system.

20. A system according to claim 16, wherein said means for removing suspended solids comprise a filter.

21. A system according to claim 20, further comprising a sidestream of said circulating aqueous coolant, said sidestream including said filter for filtering said circulating aqueous coolant.

22. A system according to claim 16, wherein said weak acid ion exchange resin is arranged for treating make-up aqueous coolant to be introduced into said system.

23. A system according to claim 16, wherein said weak acid ion exchange resin is arranged for treatment of circulating aqueous coolant.

24. A system according to claim 23, wherein said weak acid ion exchange resin is arranged in a sidestream of said circulating aqueous coolant.

25. A system according to claim 24, wherein a weak acid ion exchange resin is included in said sidestream, either in series with or parallel with said filter.

26. A process for reducing bleed-off in an open circulating heat exchange system having circulating aqueous coolant, said process comprising the steps of (1) treating all or a selected portion of the aqueous coolant with a weak acid ion exchange resin to remove alkaline salts therefrom without removing salts of strong acids and to produce in situ carbonic acid from bicarbonate hardness in the aqueous coolant and thereby control the pH of the circulating aqueous coolant without the addition of substantial acid to reduce alkalinity; (2) removing suspended solids from the circulating aqueous coolant; (3)

removing carbon dioxide from the carbonic acid produced in the treating step; and (4) introducing an effective amount of additive selected from the group consisting of scale inhibitors, corrosion inhibitors, microbiocides, and mixtures thereof into the circulating aqueous coolant so that, by the combination of steps (1), (2), (3) and (4), the amount of the bleed-off from said system is at most 66% of the bleed-off necessary in the same system without such combination of steps.

27. A process for reducing bleed-off in an open circulating heat exchange system having circulating aqueous coolant, said process comprising the steps of (1) treating all or a selected portion of the aqueous coolant with a weak acid ion exchange resin to remove alkaline salts therefrom without removing salts of strong acids and to produce in situ carbonic acid from bicarbonate hardness in the aqueous coolant and thereby control the pH of the circulating aqueous coolant without the addition of substantial acid to reduce alkalinity; (2) removing suspended solids from the circulating aqueous coolant; (3) removing carbon dioxide from the carbonic acid produced in the treating step; and (4) introducing effective amounts of scale and corrosion inhibitors and microbiocides into the circulating aqueous coolant so as to maintain a concentration of from about 10 to about 1000 ppm. of scale inhibitors, of from about 10 to about 1000 ppm. of corrosion inhibitors, and of from about 10 to about 1000 ppm. of microbiocides.

28. A process for reducing bleed-off in an open circulating heat exchange system having circulating aqueous coolant, said process comprising the steps of (1) treating all or a selected portion of the aqueous coolant with a weak acid ion exchange resin to remove alkaline salts therefrom without removing salts of strong acids and to produce in situ carbonic acid from bicarbonate hardness in the aqueous coolant and thereby control the pH of the circulating aqueous coolant without the addition of substantial acid to reduce alkalinity; (2) removing suspended solids from the circulating aqueous coolant; (3) removing carbon dioxide from the carbonic acid produced in the treating step; and (4) introducing an effective amount of additive selected from the group consisting of scale inhibitors, corrosion inhibitors, microbiocides and mixtures thereof into the circulating aqueous coolant so that, by combination of steps (1), (2), (3) and (4), bleed-off from said system is reduced to substantially zero.

29. An open circulating heat exchange system comprising a body from which heat is to be removed by a circulating aqueous coolant; a cooling tower; means for circulating the aqueous coolant between said body and said cooling tower; a weak acid ion exchange resin arranged for passage of aqueous coolant therethrough, wherein said weak acid ion exchange resin is capable of treating all or a selected portion of the aqueous coolant to remove alkaline salts therefrom without removing salts of strong acids and to produce in situ carbonic acid from bicarbonate hardness in the aqueous coolant and thereby provide control of the pH of the circulating water without the addition of substantial acid to reduce alkalinity, and wherein carbon dioxide from the carbonic acid produced in the treating step can be removed from the system in said cooling tower; means for removing suspended solids from at least a portion of said circulating aqueous coolant; and means for introducing additives selected from the group consisting of scale inhibitors, corrosion inhibitors, microbiocides and combinations thereof into the circulating aqueous coolant.

30. A process for reducing bleed-off in an open circulating heat exchange system having circulating aqueous coolant, said process comprising the steps of (1) treating all or a selected portion of the aqueous coolant with a cation exchange resin consisting essentially of a weak acid ion exchange resin to remove alkaline salts therefrom without removing salts of strong acids and to produce in situ carbonic acid from bicarbonate hardness in the aqueous coolant and thereby control the pH of the circulating aqueous coolant; (2) removing suspended solids from circulating aqueous coolant; (3) removing carbon dioxide from the carbonic acid produced in the treating step; and (4) introducing an effective amount of additive selected from the group consisting of scale inhibitors, corrosion inhibitors, microbiocides, and mixtures thereof into the circulating aqueous coolant so that, by the combination of steps (1), (2), (3) and (4), the amount of the bleed-off from said system is at most 66% of the bleed-off necessary in the same system without such combination of steps.

31. A process for reducing bleed-off in an open circulating heat exchange system having circulating aqueous coolant, said process comprising the steps of (1) treating all or a selected portion of the aqueous coolant with a cation exchange resin consisting essentially of a weak acid ion exchange resin to remove alkaline salts therefrom without removing salts of strong acids and to produce in situ carbonic acid from bicarbonate hardness in the aqueous coolant and thereby control the pH of the circulating aqueous coolant; (2) removing suspended solids from the circulating aqueous coolant; (3) removing carbon dioxide from the carbonic acid produced in the treating step; and (4) introducing effective amounts of scale and corrosion inhibitors and microbiocides into the circulating aqueous coolant so as to maintain a concentration of from about 10 to about 1000 ppm. of scale inhibitors, of from about 10 to about 1000 ppm. of corrosion inhibitors, and of from about 10 to about 1000 ppm. of microbiocides.

32. A process for reducing bleed-off in an open circulating heat exchange system having circulating aqueous coolant, said process comprising the steps of (1) treating all or a selected portion of the aqueous coolant with a cation exchange resin consisting essentially of a weak acid ion exchange resin to remove alkaline salts therefrom without removing salts of strong acids and to produce in situ carbonic acid from bicarbonate hardness in the aqueous coolant and thereby control the pH of the circulating aqueous coolant; (2) removing suspended solids from the circulating aqueous coolant; (3) removing carbon dioxide from the carbonic acid produced in the treating step; and (4) introducing an effective amount of additive selected from the group consisting of scale inhibitors, corrosion inhibitors, microbiocides and mixtures thereof into the circulating aqueous coolant so that, by combination of steps (1), (2), (3) and (4), bleed-off from said system is reduced to substantially zero.

33. An open circulating heat exchange system comprising a body from which heat is to be removed by a circulating aqueous coolant; a cooling tower; means for circulating the aqueous coolant between said body and said cooling tower; a cation exchange resin consisting essentially of a weak acid ion exchange resin arranged for passage of aqueous coolant therethrough, wherein said weak acid ion exchange resin is capable of treating all or a selected portion of the aqueous coolant to remove alkaline salts therefrom without removing salts of strong acids and to produce in situ carbonic acid from bicarbonate hardness in the aqueous coolant and thereby provide control of the pH of the circulating cooling water, and wherein carbon dioxide from the carbonic acid produced in the treating step can be removed from the system in said cooling tower; means for removing suspended solids from at least a portion of said circulating aqueous coolant; and means for introducing additives selected from the group consisting of scale inhibitors, corrosion inhibitors, microbiocides and combinations thereof into the circulating aqueous coolant.

* * * * *

UNITED STATES PATENT AND TRADEMARK OFFICE
CERTIFICATE OF CORRECTION

PATENT NO. : 4,532,045
DATED : July 30, 1985
INVENTOR(S) : Littmann

It is certified that error appears in the above-identified patent and that said Letters Patent is hereby corrected as shown below:

Column 2, line 6, after "pollution" add --control--.

Column 12, line 55, delete "additional" and substitute therefor --additive--.

Column 13, line 28, delete "reached" and substitute therefor --reduced--.

Signed and Sealed this

Twenty-ninth Day of October 1985

[SEAL]

Attest:

DONALD J. QUIGG

Attesting Officer

Commissioner of Patents and Trademarks—Designate